Oct. 14, 1924.
O. H. KOELKER
1,511,481
TRANSMISSION GREASE RETAINER
Filed Nov. 11, 1918
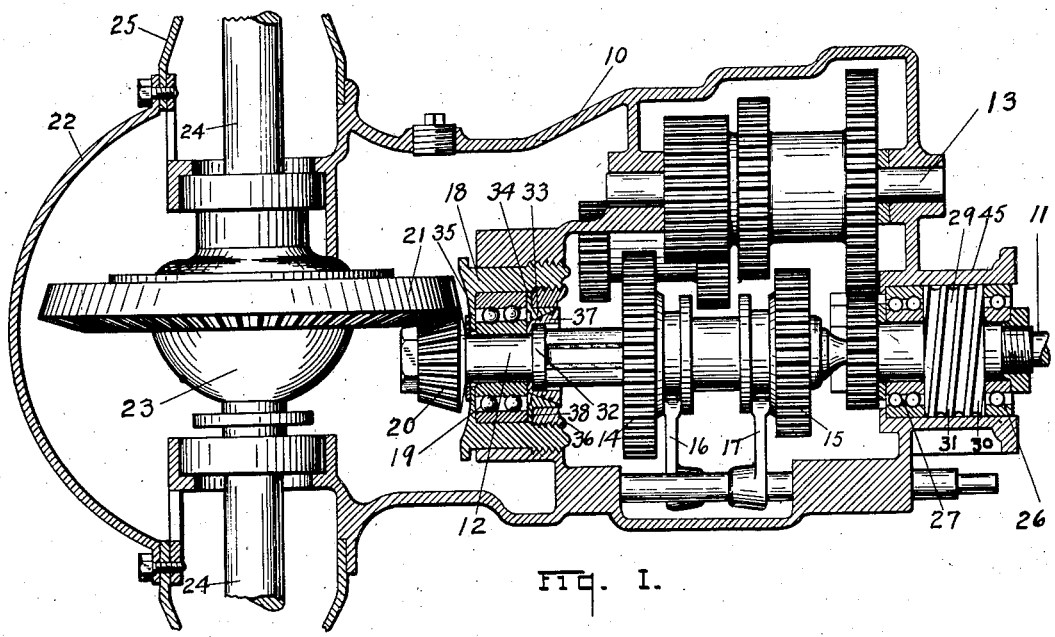
Fig. I.
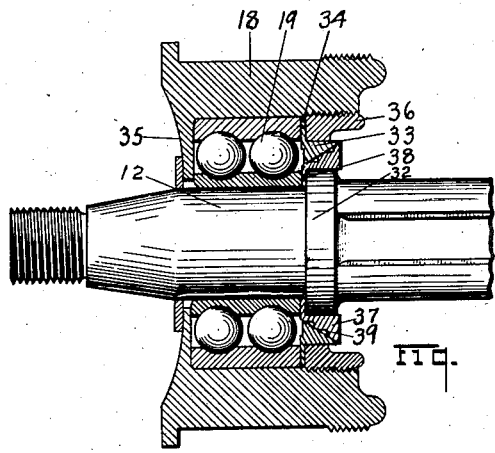
Fig. II.
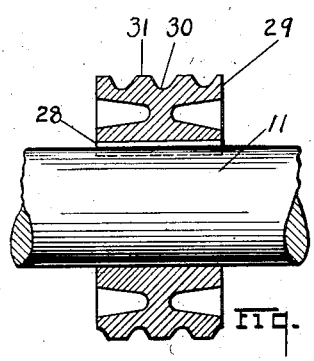
Fig. III.
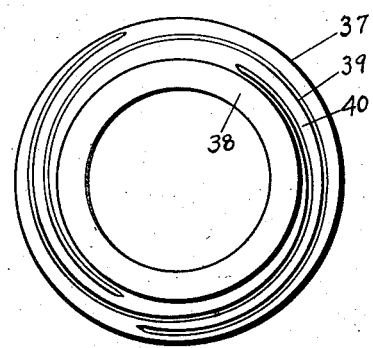
Fig. IV.
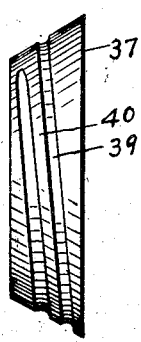
Fig. V.
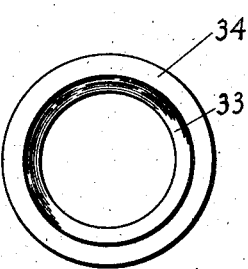
Fig. VI.
Inventor
Oscar H. Koelker
By Chester H. Braselton
Attorney

Patented Oct. 14, 1924.

1,511,481

UNITED STATES PATENT OFFICE.

OSCAR H. KOELKER, OF TOLEDO, OHIO, ASSIGNOR TO THE WILLYS-OVERLAND COMPANY, OF TOLEDO, OHIO, A CORPORATION OF OHIO.

TRANSMISSION GREASE RETAINER.

Application filed November 11, 1918. Serial No. 262,030.

*To all whom it may concern:*

Be it known that I, OSCAR H. KOELKER, a citizen of the United States, residing at Toledo, in the county of Lucas and State of Ohio, have invented certain new and useful Improvements in Transmission Grease Retainers, of which I declare the following to be a full, clear, and exact description.

My invention relates to grease retaining devices and more particularly to a form of grease retaining device designed for use upon a rotating shaft which passes through a casing, the said devices being adapted to prevent the leakage of oil from the casings around the rotating shaft.

One object of my invention is to provide grease retaining devices which will operate effectively to prevent loss of oil from the casings, without the use of packing rings, and the consequent increase in frictional resistance against the rotation on the shaft.

A further object of my invention is to provide devices of this character which will operate to return to the casings any excess of oil which may have worked into the bearings around the shaft.

A further object of my invention is to provide devices of this character which are of simple construction and efficient in operation.

Further objects of this invention relate to economies of manufacture and details of construction as will definitely appear from the detailed description to follow.

I accomplish the object of my invention in one instance by the devices and means described in the following specifications but it is evident that the same may be varied widely without departing from the scope of the invention as pointed out in the appended claims.

A structure constituting one embodiment of my invention which may be the preferred, is illustrated in the accompanying drawings, forming a part of this specification, in which:

Fig. I is a horizontal sectional view of the transmission casing, showing my improved grease retaining devices applied to the main driving shaft and the sliding gear shaft.

Fig. II is an enlarged detail sectional view of my improved grease retaining devices as applied to the sliding gear shaft.

Fig. III is an enlarged detail sectional view of that part of my improved grease reaining devices as applied to the main driving shaft.

Fig. IV is a rear elevation of one of the grease retaining rings shown in Fig. II.

Fig. V is a side elevation of the same.

Fig. VI is a front elevation of the ring shown in Fig. II.

In the drawings, similar reference numerals refer to corresponding parts throughout the several views.

My invention comprises generally devices of the character set forth designed to be applied to a rotating shaft passing through a casing, at or near the bearing portions thereof, for the purpose of preventing an undue loss of oil from the casing. I have illustrated these devices as applied to the main driving shaft, and the sliding gear shaft of an automobile, at the points where they enter the usual transmission casing.

Referring to the numbered parts of the drawing, I have shown the usual transmission casing 10 in which is rotatably mounted the usual main driving shaft 11, the gear shaft 12, and the countershaft 13. Splined or otherwise mounted upon the gear shaft 12 for movement longitudinally thereof are the sliding gears 14 and 15, which are adapted to be moved longitudinally thereof by means of the shifter forks 16 and 17 respectively. The gear shaft 12 is mounted in the usual bearing 19 positioned within the pinion adjusting sleeve 18, and carries the beveled driving pinion 20 which meshes with the beveled driving ring 21. The beveled driving ring 21 is protected by the rear axle cover plate 22 and operates the differential mechanism enclosed in the differential casing 23 in the usual manner, to rotate the rear axle shafts 24 enclosed in the rear axle housing 25.

The main driving shaft 11 is provided with two bearings 26 and 27 of the usual construction at the point where it enters the transmission casing 10. Carried by the main driving shaft 11, and secured thereto by a spline 28 or other suitable attaching means, and positioned thereon at a point between the bearings 26 and 27, is a circumferentially threaded cylindrical member 29.

The circumferentially threaded or grooved cylindrical member 29 is provided with a helical groove upon its outer face, extending in a direction opposite to the direction of rotation of the shaft, or in other words, forming a left handed groove or thread when observed from the interior of the casing. The groove formed in the circumferentially threaded cylindrical member 29 is designated by the numeral 30, while the corresponding thread or rib formed on the cylindrical surface thereof is designated by 31. The circumferentially threaded member 29 is enclosed by and fits within that portion of the transmission casing 45 which carries the bearings 26 and 27, and which has an inner face annular in cross-section to serve as a bearing for the cylindrical member 29. From this construction it results that when the main driving shaft 11 is rotated in a clock-wise direction, looking rearwardly of the main driving shaft toward the transmission casing, the circumferentially grooved member being firmly attached to the main driving shaft, will rotate therewith, and will tend to feed any excess of oil which may have escaped through the bearing 27 back into the casing.

The gear shaft 12 is provided with a shoulder 32 at a point near the bearing 19. An internally beveled ring 33 provided with an outwardly turned annular flange 34 is positioned against that side of the bearing 19 toward the interior of the transmission casing, in such a manner that the out-turned flange 34 bears against the outer ring of the bearing 19, and the outer ring of the bearing 19 and the internally beveled ring 33 are firmly held in position against the inturned annular shoulder 35 of the pinion adjusting sleeve 18, by the externally threaded clamping sleeve 36, engaging an internal thread on the pinion adjusting sleeve 18. An exteriorly beveled ring 37, provided with spiral grooves on its exteriorly beveled face, and having an inturned annular rim 38 is firmly fixed to the gear shaft 12 for rotation therewith in any suitable manner. The inturned annular rim 38 of the exteriorly beveled ring 37, as shown, overlies the shoulder 32 of the gear shaft 12, and is clamped between the shoulder 32 and the inner ring of the bearing 19. The beveled face of the exteriorly beveled ring 37 is adapted to correspond with and to bear against the beveled portion of the internally beveled ring 33. The spiral grooves 39 formed upon the beveled face of the externally beveled ring 37 extend in a direction corresponding to a right handed screw as clearly shown in Figures IV and V. From this construction it results that when the shaft 12 rotates in a clock-wise direction, looking at the shaft from front to rear, the bevel ring 37 when looking at the rear face thereof, as shown in Fig. IV will rotate in a counter-clockwise direction, and an excess of oil that may have worked between the bevel faces of the two rings, will be carried back by the groove 39 into the transmission casing. The formation of grooves 39 in the bevel face of the ring 37 results in the formation of corresponding ribs or ridges 40, which bear against the bevel face of the ring 33, and cooperates with grooves 39 to carry any excess of oil which may have worked between these bevel faces back into the transmission case.

It will be apparent, from the above description, that when the main driving shaft is rotated in a clock-wise direction looking toward the rear thereof, that the circumferentially threaded member 29, attached to the main driving shaft, will be rotated therewith and the threaded groove formed upon the outer face of the cylindrical member acting against that portion of the casing upon which it rests, and in which it is revolvably mounted, will tend to force any excess of oil, which may have worked through the inner bearing, back into the transmission casing. The exteriorally beveled ring 37 attached to the gear shaft 12 acts in a similar manner when rotating, its beveled surface bearing against the corresponding beveled surface of the ring 33, to return any excess of oil which may have worked between these surfaces to the transmission casing.

Thus it will be seen that these members provided with grooves upon their exterior faces each bears against a fixed mating face, whereby any excess of oil which has worked between these mating faces is carried back towards the interior of the casing by the helical grooves, the parts operating after the manner of an Archimedean screw.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor to any of them, except in so far as I have included such limitations within the terms of the following claims, in which it is my intention to claim all novelty inherent in my invention broadly as well as specifically.

What I claim as new and desire to secure by Letters Patent is:

1. In a device of the class described, the combination with a rotatable shaft, of a casing therefor, a grease retainer comprising a pair of members provided with inclined co-operating mating faces, one of said members being provided with an inwardly extending flange adapted to engage the rotatable shaft, and the other of the two members being provided with an outwardly extending flange adapted to engage the casing.

2. In a device of the character described, the combination of a casing, a bearing connected therewith, a shaft journalled therein, a ring secured to said casing at the inner side of the bearing and having a conical inner face and a ring carried by said shaft having a conical outer face rotatable in engagement with the inner face of said outer ring, one of said rings having a spiral groove formed on its face in a direction to carry lubricant toward that end of the ring having the larger diameter.

3. In combination, a casing, a shaft, an anti-friction bearing between said shaft and casing comprising inner and outer race members, an outer ring having a portion clamped against said outer race member, and an inner ring clamped against said inner race member, said rings having cooperating beveled faces, one of which has a spiral groove formed thereon to convey lubricant axially and toward the part of larger diameter.

4. In a device of the class described, in combination, a shaft, a casing for said shaft adapted to contain lubricant, a bearing for the shaft connected with the casing, a member interposed between the bearing and casing, and a rotatable member driven by the shaft, said members having co-operating faces, one of which is provided with a groove adapted to return to the casing lubricant tending to escape to the bearing.

5. In a device of the class described, in combination, a shaft, a casing for said shaft adapted to contain lubricant, a bearing for the shaft connected with the casing, and inter-engaging rings mounted between the bearing and casing, one of which is adapted to be rotated by the shaft, said rings co-operating to force back into the casing lubricant tending to escape to the bearing.

6. In a device of the class described, in combination, a shaft and operating means therefor, a casing surrounding said shaft and operating means and adapted to contain a supply of lubricant, a bearing for the shaft connected with the casing, and co-operating devices between the bearing and casing, one of which is actuated by the shaft, said devices being adapted to return to the casing lubricant tending to escape to the bearing.

In testimony whereof, I affix my signature.

OSCAR H. KOELKER.